United States Patent [19]

Nolan et al.

[11] 3,789,078

[45] Jan. 29, 1974

[54] DEHYDROGENATION

[75] Inventors: George J. Nolan, Tahlequah; Robert J. Hogan, Bartlesville, both of Okla.

[73] Assignee: Phillips Petroleum Company, Bartlesville, Okla.

[22] Filed: Aug. 26, 1971

[21] Appl. No.: 175,398

Related U.S. Application Data

[63] Continuation-in-part of Ser. No. 810,831, March 26, 1969, abandoned, which is a continuation-in-part of Ser. No. 654,341, July 19, 1967, abandoned.

[52] U.S. Cl......... 260/680 E, 252/437, 260/290 V, 260/346.1 R, 260/666 A, 260/669 R
[51] Int. Cl. ............................................. C07c 5/18
[58] Field of Search ................. 260/680 E; 252/437

[56] References Cited
UNITED STATES PATENTS

| | | | |
|---|---|---|---|
| 3,513,215 | 5/1970 | Ogle | 260/680 |
| 3,274,283 | 9/1966 | Bethell | 260/680 |
| 3,320,329 | 5/1967 | Nolan | 260/680 |
| 3,501,548 | 3/1970 | Nolan et al. | 260/680 |
| 3,501,547 | 3/1970 | Nolan et al. | 260/680 |

*Primary Examiner*—Paul M. Coughlan, Jr.
*Attorney, Agent, or Firm*—J. Arthur Young et al.

[57] ABSTRACT

Dehydrogenation process using an improved catalyst formed from a phosphorus-containing material such as phosphoric acid, a tin material such as tin chloride, and one of a Group Ia or IIa metal or metal-containing material.

23 Claims, No Drawings

DEHYDROGENATION

This application is a continuation-in-part of a copending application, Ser. No. 810,831, filed Mar. 26, 1969, now abandoned, which was a continuation-in-part of copending application Ser. No. 654,341, filed July 19, 1967, now abandoned.

This invention relates to a new and improved dehydrogenation catalyst and a dehydrogenation process using the improved catalyst.

Heretofore, oxidative dehydrogenation catalysts have been formed from phosphoric acid and tin oxide.

It has now been found that improved oxidative dehydrogenation catalysts can be formed from phosphoric acid or a phosphate as hereinafter defined, a tin material such as a tin halide, and at least one of a Group Ia or IIa metal or metal-containing material as hereinafter defined.

The Group Ia and IIa metals are those shown in the Periodic Table in the *Handbook of Chemistry and Physics*, published by the Chemical Rubber Company, 45th Edition (1964), page B-2, and include lithium, sodium, potassium, rubidium, cesium, francium, beryllium, magnesium, calcium, strontium, barium, and radium. Preferred are lithium, calcium, magnesium, and barium.

The new catalysts are useful for oxidatively dehydrogenating organic compounds such as alkenes, alkadienes, cycloalkenes, alkylpyridines, and alkyl aromatics.

The products of the process and catalysts of this invention are unsaturated compounds such as isoprene, styrene, and 2-methyl-5-vinylpyridine which are useful as monomers for polymerization processes to make useful materials such as rubber for pneumatic tires, polystyrene, and the like. Other products that can be produced according to this invention are heterocyclic compounds such as furan, furfural, methyl furan, pyran, and the like.

Accordingly, it is an object of this invention to provide a new and improved dehydrogenation method.

It is another object of this invention to provide a new and improved catalyst useful in dehydrogenation processes.

Other aspects, objects and advantages will become apparent to those skilled in the art upon consideration of this disclosure.

By this invention a catalyst is formed from the combination of an alkali metal phosphate, phosphoric acid and/or a phosphate as hereinafter defined, at least one tin compound as hereinafter defined, and at least one of a Group Ia or IIa metal-containing compound as hereinafter defined, each combined with the other in amounts that form a final composition effective as a catalyst for the oxidative dehydrogenation of materials specified hereinafter.

Substantially any phosphorus, tin, and Group Ia or IIa containing materials can be employed in the catalyst so long as at least one of the materials used contains oxygen, none of the materials is deleterious to dehydrogenation catalytic effects, and all the elements in the materials used other than phosphorus, tin, oxygen, and Group Ia or IIa are volatilized by heating the catalyst to at least the temperature at which the catalyst is used, e.g., 1,000°F., or are removed by washing the catalyst, e.g., with water.

Suitable phosphorus-containing materials include, besides phosphoric acid, phosphorus pentoxide, the phosphorus halides, and the Group Ia and IIa metal phosphates such as lithium phosphate, sodium phosphate, potassium phosphate, rubidium phosphate, cesium phosphate, magnesium phosphate, calcium phosphate, and the like. Other phosphorus-containing materials that can be employed in this invention are ammonium phosphate and mono- and dibasic phosphates of ammonium and of Group Ia and IIa metals such as lithium monobasic phosphate, sodium dibasic phosphate, beryllium dibasic phosphate, magnesium dibasic phosphate, barium monobasic phosphate, ammonium phosphate, ammonium dibasic phosphate, and the like.

The tin materials employed include any such material soluble or dispersable in water, alcohol, or ether and include both stannous or stannic compounds. Representative examples of suitable tin compounds are, for sake of brevity, given only as the stannic compound but it is to be understood that the corresponding stannous compound is equally as applicable. Representative examples include stannic halides (stannic fluoride, stannic chloride, stannic bromide, stannic iodide), stannic sulfate, stannic acetate, stannic oxide, stannic tartrate, and stannic nitrate.

Besides elemental Group Ia or IIa metals, Group Ia or IIa metal-containing materials that can be used include the nitrates, the halides, the sulfates, the oxalates, the acetates, the carbonates, the propionates, the tartrates, the bromates, the chlorates, the oxides, the hydroxides, and the like. Presently preferred are the Group Ia-containing materials, preferably lithium, potassium, or sodium; and most preferred are the lithium-containing materials.

The phosphorus-containing materials, the tin-containing materials, and the Group Ia or IIa metal or metal-containing materials can be combined in any conventional manner which will yield catalytic combinations suitable for conventional oxidative dehydrogenation processes. For example, the catalyst components can be combined using a coprecipitation technique as disclosed in detail hereinafter in the specific examples, by conventional aqueous or nonaqueous solution or suspension mixing, by ion exchange, by simply mixing the components by themselves without the use of additional solvents, and the like, including combinations of these techniques.

Generally, the catalysts can be formed by mixing the components for periods varying from about 1 minute to 5 hours in the presence of absence of a solvent or dispersant, at temperatures from about room temperature up to about 200°F. Ambient, sub-ambient, or super-ambient pressures, and ambient or inert atmosphere such as nitrogen, and the like can be used.

Suitable solvents or dispersants that can be employed for the combining of the catalyst components include water, alcohol, or ethers for the step of combining the tin compound and phosphorus compound, and these solvents as well as hydrocarbons, halogenated hydrocarbons, ketones, esters, and the like for any other steps of the catalyst preparation.

The catalyst itself when finished and in a condition for use in an oxidative dehydrogenation process will contain from about 0.1 to about 16 weight per cent phosphorous, from about 15 to about 75 weight per cent tin, and from about 0.1 to about 10 weight per cent Group Ia and/or IIa metal, preferably 0.1 to 5 weight per cent, all weight percentages being based upon the total weight of the final catalyst. The amounts of phosphorus, tin, and Group Ia and/or IIa metal present in the final catalyst total less than 100 per cent of the catalyst, the difference between the total and the 100 per cent being substantially combined oxygen in sufficient amount to satisfy the valence requirements of the Group Ia and/or IIa metal, tin, and phosphorus.

A presently preferred method of making the catalyst of this invention is to mix solutions or suspensions of, for example, the phosphates and/or phosphoric acid, one or more tin compounds, one or more Group Ia and/or IIa metal or compound, and at least one of ammonia, ammonium hydroxide, sodium hydroxide and potassium hydroxide, filter, wash to remove any undesirable electrolytes, dry, and calcine. A particle-forming step such as pelletizing or screening can precede or follow the drying step or calcining step.

The concentration of the various solutions that can be used to make the catalyst can vary widely, e.g., from about 0.01 to about 10 molar or more, depending on the solubility of the particular materials employed. Any order of mixing can be used, and the final pH of the mixture is generally in the range of from about 2 to about 10, preferably from about 3.5 to about 6.5. As is demonstrated in Catalyst Testing VIII, the catalyst prepared at a pH of 8 or higher is substantially stronger than a catalyst prepared at a lower pH. The precipitate that forms is separated from the liquid by any conventional means such as filtration. Thereafter the precipitate is washed with dilute aqueous ammonium salt solutions such as ammonium acetate, ammonium nitrate, ammonium sulfate, and the like, and/or with deionized water to remove electrolytes. The washed precipitate is then dried for from about 2 to about 24 hours at temperatures of from about 100° to about 300°F in air or an inert atmosphere such as nitrogen. The dried precipitate is then calcined from about 1 to about 24 hours at from about 1,000° to about 1,500°F, preferably at about the temperature at which the catalyst is to be used in the dehydrogenation process, under ambient or inert atmospheres. The drying and calcining steps remove water and other volatile materials from the catalyst, thus preshrinking the catalyst so that it will not shrink further when used in the dehydrogenation process, and also serve to activate the catalyst. As mentioned before, the particle-forming step can precede or follow the drying or calcining step. The dried and calcined catalyst is preferably formed into 1/16- to ½-inch pellets by compression molding or extrusion, or is simply screened to a desired size, such as 10–28 mesh (Tyler Sieve Series, *Mechanical Engineers Handbook* by L. S. Marks, 4th Edition, McGraw-Hill Book Co., Inc., N. Y., 1941, P. 836). Optimally a particulate tin/phosphorus/oxygen material is formed, and the Group Ia and/or IIa metal-containing compound or compounds is added by, for example, impregnation followed by drying.

The catalysts of this invention can be used in any conventional dehydrogenation, particularly oxidative dehydrogenation, process using conventional procedures and techniques. Suitable oxidative dehydrogenation processes are those which dehydrogenate at least one material selected from the group consisting of alkenes, alkadienes, cycloalkenes, alkylpyridines, and alkyl aromatics, using an elevated temperature, and a molecular oxygen-containing gas, with or without the presence of steam. The alkenes and alkadienes can contain from 3 to 10, preferably 4 to 6, carbon atoms per molecule, inclusive, and the cycloalkenes can contain from 4 to 10, preferably 4 to 6 carbon atoms per molecule, inclusive. The alkyl pyridines and alkyl aromatics can contain from 1 to 4, preferably 1 to 2, alkyl groups per molecule which themselves contain from 1 to 6, preferably 4 to 6, carbon atoms per group, inclusive, with at least one alkyl group having at least 2 carbon atoms.

Examples of suitable materials include propylene, n-butene, n-pentene, isopentenes, octenes, decenes, pentadiene, butadiene, isoprene, and the like. Also included are alkyl-substituted and unsubstituted cycloalkenes such as cyclobutene, cyclopentene, cyclohexene, 3-isopentylcyclopentene, and the like. Other materials include ethylbenzene, propylbenzene, n-butylbenzene, isobutylbenzene, hexylbenzene, 1-methyl-2-propylbenzene, 1-butyl-3-hexylbenzene, and the like. Still other materials include ethylpyridine, 2-methyl-5-ethylpyridine, 2,3,4-trimethyl-5-ethylpyridine, 2-ethyl-5-hexylpyridine, and the like.

Preferred reactions applicable to this invention are the formation of 1,3-butadiene from butenes, 1,3-pentadiene from pentenes, isoprene from 2-methylbutenes, styrene from ethylbenzene, and 2-methyl-5-vinylpyridine from 2-methyl-5-ethylpyridine, furan and acetaldehyde from butadiene, furfural, furan, and methyl furan from isoprene.

The catalysts of this invention can be used in the form of granules, mechanically formed pellets, or any other conventional form for a catalyst. The catalysts can also be employed with suitable supporting or diluting materials such as alumina (preferably eta or gamma or mixtures thereof), boria, beryllia, magnesia, titania, zirconia, and similar conventional materials known in the art.

The amount of catalyst employed will vary widely depending on the materials present and the conversion and selectivity desired, but generally the amount will be that which, for the given reaction, is an effective catalytic amount to produce the desired dehydrogenation results.

The molecular oxygen-containing gas employed can be present as such or with inert diluents such as nitrogen and the like. Suitable molecular oxygen-containing gases include air, flue gases containing residual oxygen, and any other conventional gas of a similar nature. Pure or substantially pure oxygen can also be employed if desired.

The operating conditions for the process of this invention can vary widely but will generally include a temperature from about 700° to about 1,300°F, preferably from about 800 to about 1,200°F; a pressure from about 0.05 to about 250, preferably from about 0.1 to about 25, psia; an oxygen to gaseous organic compound feed volume ratio of from about 0.1/1 to about 3/1, preferably from about 0.5/1 to about 2/1; and, if used, a steam to organic compound feed volume ratio of 0.1/1 to 50/1, preferably 5/1 to 20/1. The organic compound feed space rate (volumes organic compound vapor/volume of catalyst/hour, 32°F, 15 psia) can be from about 50 to about 5,000, preferably from about 100 to about 2,500.

The process of this invention is ordinarily carried out by forming a mixture, preferably preheated, of organic compound feed, steam, if used, and oxygen and/or oxygen-containing gases and passing this mixture over the catalyst at the desired temperature. Recycle of unconverted organic compound feed can be employed if desired; however, the conversion rates and selectivity of this invention are generally sufficiently high to justify a single pass operation, if, for example, the product streams can be used without separation steps in a subsequent operation, such as polymerization.

EXAMPLE

CATALYST PREPARATIONS

Catalyst 1

Aqueous ammonia (28 weight per cent $NH_3$) was added with stirring to 3 liters of deionized water containing sufficient 85 per cent phosphoric acid and $SnCl_4 \cdot 5H_2O$ to yield a final phosphorus content of 3.1 weight per cent and a final tin content of 73 weight per cent, both weight percentages being based on the total weight of the catalyst. Sufficient ammonia was added to give a final pH of 4, and the product was filtered, washed twice with 3-liter portions of 0.5 molar $NH_4NO_3$, once with a 3-liter portion of deionized water, and dried 58 hours at 240°F. and 2 hours at 1,100°F.

Catalyst 2

A. 46.5 pounds (lb) of $SnCl_4 \cdot 5H_2O$ was dissolved in 13 liters (l) of deionized water.

B. 8 gallons (gal) of aqueous ammonia (28 weight per cent $NH_3$) was diluted with 8 gal of deionized water.

A and B were added to 13 gal of deionized water over a 27-minute period with stirring, with the addition rate of B controlled to maintain the pH of 5. About 15 gal of B was used. After 1 hour of stirring the suspension was filtered, and the precipitate was washed 4 times with a solution of 6.5 lb $NH_4NO_3$ in 20 gal of deionized water, and twice with a solution of 1.5 lb of $NH_4NO_3$ in 20 gal of deionized water. After filtration it was determined that the wet gel contained 38 weight per cent $SnO_2$.

Catalyst 3

A paste was made of 100 grams (g) of commercial stannic oxide identified as B and A and marketed by Allied Chemical Company and 7.5 g of 85 per cent phosphoric acid, formed into ½-inch, diameter and height, pellets, and calcined 3 hours at 1,100°F. The final phosphorus content was 1.9 weight per cent and the final tin content was 76 weight per cent, both weight percentages based on the total weight of the catalyst.

Catalyst 4

To a 4470 g portion of Catalyst 2, 316 g of 85 per cent phosphoric acid was added with rapid stirring over a 30-minute period. The resulting material was air dried 2 days, and calcined 1 hour in air at 1,100°F. The temperature was increased from ambient to 1,100°F. at the rate of 5° per minute. The calcined material was ground to about 6 mesh (Tyler). The final phosphorus content was 5.0 weight per cent and the final tin content was 69 weight per cent, both weight percentages based on the total weight of the catalyst.

Catalyst 5

Sufficient lithium chloride to give 5 weight per cent lithium in and based on the total weight of the final catalyst was dissolved in sufficient deionized water to just wet a 15-gram portion of Catalyst 4 and added to that amount of catalyst, mixed, dried 2 hours in air at 320°F. and calcined 2 hours in air at 1,100°F.

Catalyst 6

This catalyst was prepared in the same manner as Catalyst 5 except that magnesium nitrate was used.

Catalyst 7

This catalyst was prepared in the same manner as Catalyst 5 except that barium nitrate was used.

Catalyst 8

This catalyst was prepared in the same manner as Catalyst 2. After the final filtration it was determined that the wet gel contained 25 weight per cent $SnO_2$.

Catalyst 9

A paste was made by mixing 30 milliliters (ml) of deionized water, 2.5 g of lithium nitrate, 1.86 g of 85 per cent phosphoric acid, and 50 g of commercial stannic oxide identified as B and A and marketed by Allied Chemical Company, dried 24 hours in a vacuum oven at 194°F., and calcined 2 hours at 1,100°F. The lithium, phosphorus, and tin contents were 0.5, 0.9, and 76 weight per cent, respectively, based on the total weight of the catalyst.

Catalyst 10

A paste was made by mixing 25 ml of deionized water, 5 g of lithium nitrate, 14.9 g of 85 per cent phosphoric acid, and 208 g of Catalyst 8 (equivalent to 50 g of $SnO_2$), dried 24 hours in a vacuum oven at 320°F., and calcined 2 hours at 1,100°F. The lithium, phosphorus, and tin contents were 1.3, 6.6, and 63 weight per cent, respectively, based on the total weight of the catalyst.

Catalyst 11

This catalyst was prepared in the same manner as Catalyst 10 except that 15 g of lithium nitrate was used. The lithium, phosphorus, and tin contents were 3.5, 6.6, and 60 weight per cent, respectively, based on the total weight of the catalyst.

Catalyst 12

This catalyst was prepared in the same manner as Catalyst 10 except that 9.29 g of 85 per cent phosphoric acid was used. The lithium, phosphorus, and tin contents were 1.2, 4.2, and 68 weight per cent, respectively, based on the total weight of the catalyst.

Catalyst 13

This catalyst was prepared in the same manner as Catalyst 12 except that 0.20 g of 85 per cent phosphoric acid was used. The lithium, phosphorus, and tin contents were 2.6, 3.6, and 67 weight per cent, respectively, based on the total weight of the catalyst.

Catalyst 14

This catalyst was prepared in the same manner as Catalyst 10 except that no lithium nitrate was used. The phosphorus and tin contents were 7.1 and 65 weight per cent, respectively, based on total weight of the catalyst.

Catalyst 15

This catalyst was prepared in the same manner as Catalyst 12 except that no lithium nitrate was used. The phosphorus and tin contents were 4.6 and 70 weight per cent, respectively, based on the total weight of the catalyst.

Catalyst 16

This catalyst was prepared in the same manner as Catalyst 9 except that the stannic oxide used was a portion of Catalyst 8 that had been calcined 3 hours at 1,100°F., and the amounts of lithium nitrate and 85 per cent phosphoric acid used were such that the lithium, phosphorus, and tin contents were 0.8, 4.3, and 69 weight per cent, respectively, based on the total weight of the catalyst.

Catalyst 17

A 196 g of $SnCl_4 \cdot 5H_2O$ was dissolved in 1 liter of deionized water, and 100 ml of concentrated sulfuric acid and 24.5 g of 85 phosphoric acid were added.

B. An aqueous ammonia solution containing about 8 weight per cent $NH_3$ was prepared.

C. 264 g of ammonium sulfate was dissolved in sufficient deionized water to make 1 liter.

A and B were added to C with rapid stirring over a 30-minute period. The rate of addition of B was adjusted to maintain the pH at about 5.5. After filtration the precipitate was washed twice with 3 liters of 0.5 molar ammonium sulfate and once with 2 liters of deionized water. The wet gel contained 25.2 weight per cent solids. A 198.5-g portion of the wet gel was mixed with 13.88 g of lithium nitrate dissolved in about 25 ml deionized water, dried at 212°F. for several hours, and calcined 2 hours at 1,100°F. Lithium, phosphorous, and tin contents were 2.3, 5.8, and 64 weight per cent, respectively, based on the total weight of the catalyst.

Catalyst 18

The tin-phosphorous gel used for preparing this catalyst was prepared in the same manner as that used for Catalyst 17 except that 185 g of $SnCl_4 \cdot 5H_2O$ and 30 g of 85 per cent phosphoric acid were used, and the addition time was 40 minutes. The wet gel contained 19.6 weight per cent solids. A 235-g portion of the wet gel was mixed with 12.81 g of lithium nitrate dissolved in about 25 ml deionized water, dried at 212°F. for several hours, and calcined 2 hours at 1,100°F. Lithium, phosphorous, and tin contents were 2.3, 7.2, and 60 weight per cent, respectively, based on the total weight of the catalyst.

Catalyst 19

This catalyst was prepared by mixing 4 liters of an aqueous ammonium hydroxide solution containing 1,500 ml of ammonium hydroxide, 9 liters of an aqueous solution of stannic chloride containing 4 lb of $SnCl_4 \cdot 5H_2O$, and 1,000 ml of an aqueous solution of phosphoric acid containing 335 g of 85 per cent phosphoric acid. The pH of the final mixture was about 4.5. The precipitate formed in the final mixture was separated from the liquid by filtering, washed twice with 0.5-molar ammonium nitrate, and finally with 16 liters of 0.1 molar ammonium nitrate. The washed precipitate was then dried at a temperature of 300°F and ambient pressure. The dried catalyst was calcined for 10 hours at 1,100°F and ambient pressure. Phosphorus and tin contents were 9.0 and 60 weight per cent, respectively, based on the total weight of the catalyst.

Catalyst 20

This catalyst was prepared by adding an aqueous solution of phosphoric acid containing 21 grams of 85 weight per cent phosphoric acid and diluted to a concentration of 45 weight per cent acid to an aqueous slurry of calcium hydroxide containing 20 grams of calcium hydroxide to give a resulting mixture which had a phosphate to calcium weight ratio of about 2/3. To this resulting slurry was added sufficient calcium hydroxide to give a calcium oxide to phosphorus pentoxide weight ratio of about 4.8/1. This mixture was then rapidly stirred at 80°F. and a mixture of stannic chloride and phosphoric acid was added to the stirred mixture. The mixture of stannic chloride and phosphoric acid had a stannic oxide to the dibasic stannic phosphate weight ratio of about 2.5/1. Aqueous ammonia was simultaneously added to the stirred mixture to maintain the pH at 6. A precipitate was thus formed, separated by filtration, washed twice with 2 liters of 0.5 molar $NH_4NO_3$ and once with 2 liters of 0.1 molar $NH_4NO_3$, dried for about 24 hours at 320°F. under ambient atmosphere and pressure, and calcined 4 hours at 1,100°F. under ambient atmosphere and pressure. Calcium, phosphorus, and tin contents were 7.9, 10.5, and 50 weight per cent, respectively, based on the total weight of the catalyst.

Catalysts 21–25

Various amounts of stannous sulfate, lithium dihydrogen phosphate, and ammonium dihydrogen phosphate were dry mixed with 6 weight percent Cab-O-Sil (finely divided silica) and 3 percent lubricant. The mixtures were tableted, calcined overnight at 1,200°F, ground, and screened to 12/28 mesh (Tyler). The lithium, phosphorous, and tin contents, based on the total weight of the catlaysts were as follows:

| Catalyst | Weight Percent | | |
|---|---|---|---|
| | Li | P | Sn |
| 21 | 0.87 | 7 | 64 |
| 22 | 0.75 | 4 | 70 |
| 23 | 0.75 | 5 | 68 |
| 24 | 0.75 | 6 | 66 |
| 25 | 0.75 | 7 | 64 |

Catalysts 26–29

These catalysts were prepared in the same manner as Catalyst 21. Lithium was added to Catalyst 26 as lithium dihydrogen phosphate. There was no lithium in Catalyst 27. Lithium was added to Catalysts 28–29 by impregnation with aqueous lithium nitrate after the calcium step. The lithium, phosphorus, and tin contents, based on the total weight of the catalysts were as follows:

| Catalyst | Weight Percent | | |
|---|---|---|---|
| | Li | P | Sn |
| 26 | 2 | 10 | 64 |
| 27 | 0 | 5 | 65 |
| 28 | 1 | 5 | 65 |
| 29 | 2 | 5 | 65 |

Catalyst 30

A. 17.22 pounds of $SnCl_4 \cdot 5H_2O$ and 100 milliliters of concentrated hydrochloric acid were dissolved in four gallons of deionized water.

B. 3.72 pounds of 85 percent $H_3PO_4$ were dissolved in two gallons of deionized water.

C. One pound of $(NH_4)_2SO_4$ and 7 liters of 58 percent ammonium hydroxide were dissolved in 15 gallons of deionized water.

The temperature of all three solutions was adjusted to about 70°F.

A reactor was filled with 5 gallons of deionized water and 0.5 pound of $(NH_4)_2SO_4$ and the pH was adjusted to 3.5. The temperature of the reactor was maintained at 90°F or below.

Solutions A and B were mixed and fed to the reactor over a one-hour period. Solution C was fed to the reactor at the rate required to maintain the pH at about 3.5.

After one hour of stirring, the mixture was filtered and the precipitate was washed with one pound of ammonium sulfate in 10 gallons of deionized water. This step was repeated four times. The precipitate was then spray-dried and tableted, ground, and screened to 8/16 mesh (U.S.). The granules were impregnated with aqueous lithium nitrate solution, and calcined. The percentages phosphorus, lithium, and tin, based on the total weight of the catalysts were 10, 1.5, and 58.4, respectively.

Catalyst 31

A. 274 grams of $SnCl_4 \cdot 5H_2O$ was dissolved in 15 liters of deionized water followed by the addition of 118 grams of 85 per cent $H_3PO_4$ and 175 milliliters of approximately 96 per cent $H_2SO_4$.

B. 420 milliliters of concentrated ammonium hydroxide was diluted with one liter of water.

Solutions A and B were added simultaneously over a period of about five minutes to a one-liter solution of two molar $(NH_4)_2SO_4$. The pH was adjusted to 4.5, the solution was filtered and the precipitate was washed once with 3 liters of deionized water, dried at 150°C and calcined at 1,100°F.

The catalyst contained 46 percent tin and 16 percent phosphorus, based on the total weight of catalyst.

Catalyst 32

This catalyst was prepared in the same manner as Catalyst 31, except that pH during a 40-minute addition period was kept at 5.5, the precipitate was washed twice with 3 liters of 0.5 molar ammonium sulfate and once with two liters of deionized water, and the wet gel was impregnated with aqueous lithium nitrate. The catalyst contained 63 percent tin, 2.3 percent lithium, and 7.2 percent phosphorus, based on the total weight of catalyst.

Catalyst 33

One cc of 85 percent $H_3PO_4$ was added to a slurry of 15 grams of stannous sulfate and 10 cc of $H_2O$. The mixture was dried at 500°F and calcined at 1,100°F. The catalyst contained 72 weight percent tin, 3 weight percent phosphorus, and 1.5 weight percent sulfur.

Catalyst 34

519.1 Grams of $Sn(SO_4)_2 \cdot 2H_2O$, 89.2 grams of 85 percent phosphoric acid, and 89.5 grams of lithium nitrate were admixed. The mixture was then mulled, dried, extruded, and calcined. The catalyst contained 8 percent phosphorus, 3 percent lithium, and 54.2 percent tin, based on the total weight of the catalyst.

CATALYST TESTING I

All catalysts were tested for butene-2 dehydrogenation at atmospheric pressure and a furnace temperature of 1,000°F., using the following gas flows:

TABLE I

| | Space Rate, v/v/hr (a) |
|---|---|
| Butene-2 | 200 |
| Air | 1000 |
| Steam | 2400 – 2500 |

(a) Space rates are expressed as volumes of vapor per volume of catalyst per hour at 32°F and 15 psia.

Butene conversion (conv) and butadiene yield (yld), both in moles per 100 moles of butene-2 in the feed, were determined after ¼ and 3 hours on stream. Those data, which are given in Table II, indicate that not only are the butene conversion and butadiene yield higher initially with the catalysts of this invention, but, surprisingly, remained higher for a full 3 hours on stream. In an extended run made with one of the catalysts of the invention with a somewhat higher steam space rate, which is also given in Table II, the butadiene yield decreased only 4 percentage points in 238 hours. Thus, the catalysts of the invention surprisingly permit both a longer dehydrogenation period and a higher butadiene yield than can be obtained by the non-promoted tin/phosphorus catalysts.

To assist in the consideration of the catalyst test data in Table II an entry related to the preparation of each catalyst has been made. In those "shorthand" entries the following abbreviations are used:

TABLE II

| | Promoter | | Wt., per cent | | Method of | Time on Stream, hours | | | |
|---|---|---|---|---|---|---|---|---|---|
| | | | | | | 1/4 | | 3 | |
| Catalyst | Metal | Wt., %(2) | P | Sn | Preparation | Conv | Yld | Conv | Yld |
| 1 | — | — | 3.1 | 73 | Copptn (sn/P) | 90 | 77 | 70 | 55 |
| 17 | Li | 2.3 | 5.8 | 64 | Copptn (Sn/P)-wet gel impreg (Li) | 87 | 78 | 87 | 79 |
| 18 | Li | 2.3 | 7.2 | 60 | Copptn (Sn/P)-wet gel impreg (Li) | 97 | 89 | 97 | 89 |
| 14 | — | — | 7.1 | 65 | Pptn (Sn)-wet gel impreg (P) | 96 | 82 | 79 | 62 |
| 15 | — | — | 4.6 | 70 | Pptn (Sn)-wet gel impreg (P) | 93 | 80 | 69 | 58 |
| 10 | Li | 1.3 | 6.6 | 63 | Pptn (Sn)-wet gel impreg (Li/P) | 99 | 84 | 77 | 66 |
| 11 | Li | 3.5 | 6.6 | 60 | Pptn (Sn)-wet gel impreg (Li/P) | 98 | 86 | 98 | 84 |
| 12 | Li | 1.2 | 4.2 | 68 | Pptn (Sn)-wet gel impreg (Li/P) | 96 | 84 | 85 | 73 |
| 13 | Li | 2.6 | 3.6 | 67 | Pptn (Sn)-wet gel impreg (Li/P) | 90 | 76 | 92 | 79 |
| 3 | — | — | 1.9 | 76 | Impreg of comm'l $SnO_2$ with P | 93 | 84 | 57 | 42 |
| 9 | Li | 0.5 | 0.9 | 76 | Impreg of comm'l $SnO_2$ with Li/P | — | — | 63 | 60 |
| 16 | Li | 0.8 | 4.3 | 69 | Impreg of calcined $SnO_2$ gel with Li/P | 95 | 90 | 84 | 75 |
| 4 | — | — | 5.0 | 69 | Impreg of wet $SnO_2$ gel with P | 91 | 82 | 65 | 53 |
| 5 | Li | 5.0 | 5.0 | 69 | Impreg of wet $SnO_2$ gel with P, and | 87 | 74 | 82 | 71 |
| 6 | Mg | 5.0 | 5.0 | 69 | impreg of this material after | 89 | 76 | 72 | 59 |
| 7 | Ba | 5.0 | 5.0 | 69 | calcining with promoter metal | 85 | 75 | 71 | 60 |
| 19 | — | — | 9.0 | 60 | Copptn (Sn/P) | 94 | 86 | 70 | 54 |
| 20 | Ca | 7.9 | 10.5 | 50 | Ca/Sn/P copptd in presence of copptd Ca/P | 97 | 88 | 79 | 64 |
| | | | | | | 1/4 | | 238 | |
| 18(1) | Li | 2.3 | 7.2 | 60 | Copptn (Sn/P)-wet gel impreg (Li) | 99 | 93 | 98 | 89 |

(1) Steam space rate during this extended run was 4000 v/v/hr. There was no regeneration during the run.
(2) Based on the total weight of the catalyst.

Copptn = coprecipitation
Impreg = impregnation
Ppnt = precipitation
Comm'l = commercial
Copptd = coprecipitated All catalysts were ground and screened to 20-28 mesh (Tyler) for testing. The phosphorus and promoter metal concentrations are by analysis; the tin concentrations were calculated assuming no loss of tin.

CATALYST TESTING II

Catalysts 21-25 were tested for butene dehydrogenation according to procedure of Catalyst Testing I. The results are given in Table III.
The results obtained with the catalyst prepared by dry-mixing are comparable with those for the catalyst prepared by the wet procedure.

CATALYST TESTING III

Catalysts 26-29 were tested for butene dehydrogenation according to the procedure of Catalyst Testing I. The catalysts were evaluated at 1000°F, 200 GHSV butenes, 1,000 GHSV air, and 2,400 GHSV steam. The results are given in Table IV.

TABLE IV

| Catalyst | 15 min | Time on Stream 1 hr Conversion/Yield | 3 hr |
|---|---|---|---|
| 26 | 75/73 | 71/69 | 69/65 |
| 27 | 90/87 | 76/69 | 58/48 |
| 28 | 82/79 | 77/68 | 73/61 |
| 29 | 44/43 | 49/45 | 49/43 |

Adding lithium as lithium dihydrogen phosphate stabilized catalyst conversion and yield over the three hour run and are superior to impregnation after calcining as a means of adding lithium to the phosphorus-containing catalysts.

CATALYST TESTING IV

Catalyst 30 was tested for butene oxidative dehydrogenation according to the procedure of Catalyst Testing I. Results are given in Table V.
Results are comparable with those for the other catalysts tested.

CATALYST TESTING V

Catalysts 31 and 32 were tested according to the procedure of Catalyst Testing I, except that the hydrocarbon feed was 1,3-butadiene instead of n-butene. The results are given in Table VI.

TABLE III

| Catalyst | Butene GHSV | Mol ratio to butene steam | air | Conversion/Yield 1000°F 15 min | 1000°F 3 hr | 900°F 15 min |
|---|---|---|---|---|---|---|
| 21 | 200 | 13/1 | 5/1 | 99/91 | 98/87 | 69/68 |
| 21 | 400 | 18/1 | 5/1 | 56/55 | 67/66 | 30/30 |
| 22 | 300 | 18/1 | 5/1 | 48/46 | 48/46 | 14/13 |
| 23 | 300 | 18/1 | 5/1 | 59/59 | 60/59 | 20/20 |
| 24 | 300 | 18/1 | 5/1 | 59/59 | 62/61 | 24/24 |
| 25 | 300 | 18/1 | 5/1 | 65/65 | 73/69 | 29/29 |

TABLE V

| Butene GHSV | Mol ratio to butene steam | air | Conversion/Yield 900°F 1/4 hr | 3 hr | 1000°F 1/4 hr | 3 hr |
|---|---|---|---|---|---|---|
| 300 | 20/1 | 4/1 | 42/42 | 55/53 | 71/70 | 79/77 |

TABLE VI

| Run Temp °F | GHSV 1,3-Buta-diene | $O_2$ | $N_2$ | Steam | Conv. of $C_4H_6$ % | Yield of Furan, Mol.% | Yield of Acetaldehyde, Mol.% |
|---|---|---|---|---|---|---|---|
| | | | | Catalyst 31 | | | |
| 1100 | 400 | 200 | 1800 | 8000 | 2.82 | 0.28 | 0.25 |
| 1100 | 100 | 50 | 450 | 2000 | 6.31 | 1.99 | 0.47 |
| 1200 | 100 | 50 | 450 | 2000 | 11.32 | 2.21 | 0.79 |
| 1000 | 50 | 100 | 150 | 500 | 45.74 | 6.16 | 1.45 |
| 1000 | 200 | 400 | 600 | 4000 | 7.18 | 2.58 | 0.78 |
| | | | | Catalyst 32 | | | |
| 1000 | 100 | 100 | 400 | 2000 | 6.56 | 1.72 | 0.83 |
| 1100 | 100 | 100 | 400 | 2000 | 23.88 | 5.82 | 1.45 |
| 1200 | 100 | 100 | 400 | 2000 | 33.88 | 8.05 | 1.40 |
| 1000 | 50 | 50 | 200 | 1000 | 24.59 | 4.63 | 1.65 |
| 1000 | 50 | 100 | 150 | 1000 | 29.52 | 5.79 | 1.47 |

TABLE VI—Continued

| Run Temp °F | 1,3-Buta-diene | GHSV O₂ | N₂ | Steam | Conv. of $C_4H_6$ % | Yield of Furan, Mol,% | Yield of Acetalde-hyde, Mol,% |
|---|---|---|---|---|---|---|---|
| | | | | Catalyst 32—Continued | | | |
| 1000 | 200 | 200 | 800 | 0 | 28.32 | 1.88 | 0.18 |
| 1000 | 100 | 400 | 100 | 2000 | 52.00 | 9.10 | 1.44 |
| 1000 | 200 | 400 | 600 | 4000 | 15.08 | 4.18 | 1.10 |
| 1000 | 400 | 800 | 1200 | 8000 | 7.34 | 2.57 | 0.69 |
| 1100 | 400 | 800 | 1200 | 8000 | 7.09 | 2.84 | 0.55 |
| 1100 | 400 | 400 | 1600 | 8000 | 5.85 | 2.46 | 0.56 |
| 1100 | 400 | 200 | 1800 | 8000 | 4.72 | 2.05 | 0.43 |
| 1200 | 400 | 200 | 1800 | 8000 | 10.05 | 3.94 | 0.53 |
| 1100 | 200 | 100 | 900 | 4000 | 5.73 | 2.50 | 0.54 |

CATALYST TESTING VI

Catalyst 33 was tested according to the procedure of Catalyst Testing I. Results are given in Table VII.

CATALYST TESTING VII

Catalyst 34 was tested according to the procedure of Catalyst Testing I. Butene was converted at a temperature of 1,000°F. Results are given in Table VIII.

TABLE VII

| Feed | feed | GHSV air | steam | Temp., °F | Conversion/Yield after 15 min |
|---|---|---|---|---|---|
| 2-Methyl-butene | 200 | 1000 | 5000 | 900 | 73/65 |
| Pentene-2 | 200 | 1000 | 2400 | 1000 | 97/91 |

TABLE VIII

| GHSV | Mol Ratio to Butene steam | air | Conversion/Yield |
|---|---|---|---|
| 200 | ~15/1 | 4.5/1 | 96/92 |

CATALYST TESTING VIII

Two catalysts were prepared according to the procedure of Catalyst 1, except that one catalyst was precipitated at a pH of 4 and the other at a pH of 8. The catalysts were then tested according to the procedure of Catalyst Testing I. The dehydrogenation period was for 15 minutes at a temperature of 1,000°F. Results are given in Table IX.

It was also found that the catalyst precipitated at a pH of 4 was crushed to a fine dust under a load of 500 pounds per square inch of powder surface, whereas the catalyst prepared at a pH of 8 withstood a load of 75,000 pounds per square inch of powder surface.

These results demonstrate the catalyst prepared at a pH are 8 substantially stronger than the catalyst prepared at a pH of 4.

CATALYST TESTING IX

Catalysts were prepared by slowly adding, over an interval of about 30 minutes, 316 parts by weight of 85 per cent phosphoric acid to 4470 parts by weight of hydrous stannic oxide containing 38 per cent solids with rapid stirring. The resulting hydrous gel was air dried for two days, and then calcined one hour in 1,000 GHSV of air at approximately 1,100°F. The calcined material was ground to less than or equal to about 6 mesh and used as Catalyst 37 in runs shown in Tables X and XI below.

Portions of the above-prepared tin/phosphorus/oxygen catalyst were impregnated with aqueous solutions of desired metal salt promoters to give the indicated percent by weight amount of promoter.

The several catalysts then were tested under oxidative dehydrogenation conditions using 200 GHSV butene, 1,000 GHSV air, 2400 GHSV steam. Results are shown in the following tables:

TABLE IX

| pH at Precipitation | GHSV Butene | Mol Ratio to Butene steam | air | Conv./ Yield | Butadiene Yield Per Unit Surface Area |
|---|---|---|---|---|---|
| 4 | 300 | 18/1 | 4/1 | 83/79 | 0.9 |
| 8 | 300 | 18/1 | 4/1 | 26/26 | 26.0 |

TABLE X

| Catalyst No. | Catalyst | Conversion Temperature 1000°F | | | | | |
|---|---|---|---|---|---|---|---|
| | | After ¼ Hr. | | After 1 Hr. | | After 3 Hrs. | |
| | | Con. | Mod. | Con. | Mod. | Con. | Mod. |
| 37 | Control Sn/P/O | 88 | 87 | 73 | 83 | 63 | 80 |
| 38 | +0.2 % Li | 90 | 87 | 77 | 85 | 64 | 81 |
| 39 | +2.0 % Li | 87 | 85 | 85 | 86 | 82 | 87 |
| 40 | +0.2 % Na | 92 | 87 | 78 | 84 | 65 | 81 |

TABLE X—Continued

| Catalyst No. | Catalyst | Conversion Temperature 1000°F | | | | | |
|---|---|---|---|---|---|---|---|
| | | After ¼ Hr. | | After 1 Hr. | | After 3 Hrs. | |
| | | Con. | Mod. | Con. | Mod. | Con. | Mod. |
| 41 | +2.0 % Na | 89 | 89 | 76 | 86 | 62 | 81 |
| 42 | +0.2 % K | 91 | 86 | 79 | 84 | 68 | 82 |
| 43 | +0.2 % Rb | 86 | 88 | 67 | 82 | 59 | 81 |
| 44 | +2.0 % Rb | 78 | 90 | 69 | 88 | 57 | 82 |

TABLE XI

| No. | Catalyst | 900°F After ¼ Hr. | | 1100°F After ¼ Hr. | |
|---|---|---|---|---|---|
| | | Con. | Mod. | Con. | Mod. |
| 37 | Control Sn/P/O | 85 | 88 | 87 | 85 |
| 38 | +0.2 % Li | 82 | 89 | 88 | 85 |
| 39 | +2.0 % Li | 67 | 88 | 92 | 82 |
| 40 | +0.2 % Na | 82 | 88 | 92 | 85 |
| 41 | +2.0 % Na | 80 | 90 | 91 | 87 |
| 42 | +0.2 % K | 81 | 87 | 91 | 83 |
| 43 | +0.2 % Rb | 83 | 88 | 85 | 85 |
| 44 | +2.0 % Rb | 70 | 91 | 85 | 86 |

These data indicate that the promoted catalysts improve conversion, or modivity, or both, in conversion reactions tested.

CATALYST TESTING X

Additional catalysts were prepared to further test effectiveness of the promoted tin/phosphorus/oxygen catalyst compositions. A basic tin/phosphorus/oxygen catalyst composition containing 10 weight per cent phosphorus was impregnated with various amounts of sodium nitrate solution to provide catalysts containing various amounts of sodium as indicated in Tables XII and XIII. These catalysts then were utilized in comparative runs with a butene-2 feed at 900°F, and also 1000°F, with the results as shown being on samples taken after 3 hours operation:

These data indicate the high effectiveness of our sodium promoted tin/phosphorus/oxygen catalysts.

CATALYST TESTING XI

Additional catalysts were prepared utilizing the tin/phosphorus/oxygen base composition containing 10 weight percent phosphorus and impregnated with various levels of potassium nitrate in order to provide levels of potassium as indicated below. These catalysts were tested at 900°F, and also 1,000°F, using a butene-2 feed to determine oxidative dehydrogenation properties.

TABLE XII

900°F., Oxygen 264 GHSV, Feed 300 GHSV

| Catalyst No. | Catalyst | Conversion % | Yield, % | Modivity, % | Steam Ratio |
|---|---|---|---|---|---|
| 45 | 0 % Na | 32.0 | 29.3 | 91.7 | 19.6 |
| 46 | 4 % Na | 39.0 | 37.4 | 95.9 | 23.3 |
| 47 | 5 % Na | 40.0 | 38.5 | 96.1 | 23.3 |
| 48 | 6 % Na | 41.4 | 39.5 | 95.4 | 21.0 |
| 49 | 7 % Na | 35.7 | 33.2 | 93.0 | 19.2 |
| 50 | 8 % Na | 24.6 | 22.8 | 92.7 | 23.3 |
| 51 | 9 % Na | 25.2 | 22.7 | 90.0 | 20.4 |
| 52 | 10 % Na | 32.2 | 29.5 | 91.8 | 19.5 |
| 53 | 11 % Na | 23.8 | 21.4 | 90.0 | 19.3 |
| 54 | 12 % Na | 26.4 | 22.4 | 84.8 | 17.6 |
| 55 | 13 % Na | 24.6 | 21.7 | 88.5 | 18.8 |

TABLE XIII

1000°F., Oxygen 264 GHSV, Feed 300 GHSV

| Catalyst No. | Catalyst | Conversion % | Yield, % | Modivity, % | Steam Ratio |
|---|---|---|---|---|---|
| 45 | 0 % Na | 38.2 | 34.4 | 90.3 | 19.6 |
| 46 | 4 % Na | 46.6 | 44.2 | 94.8 | 23.3 |
| 47 | 5 % Na | 53.6 | 50.9 | 95.0 | 23.3 |
| 48 | 6 % Na | 54.0 | 51.3 | 95.0 | 21.0 |
| 49 | 7 % Na | 61.4 | 57.7 | 93.9 | 19.2 |
| 50 | 8 % Na | 44.4 | 42.0 | 94.7 | 23.3 |
| 51 | 9 % Na | 51.2 | 47.0 | 91.8 | 20.4 |
| 52 | 10 % Na | 56.9 | 53.1 | 93.3 | 19.5 |
| 53 | 11 % Na | 52.3 | 47.7 | 91.1 | 19.3 |
| 54 | 12 % Na | 53.6 | 47.5 | 88.6 | 17.6 |
| 55 | 13 % Na | 50.4 | 45.7 | 90.7 | 18.8 |

Results obtained are shown below on samples taken after 3 hours operation:

TABLE XIV

900°F., Oxygen 264 GHSV, Feed 300 GHSV

| Catalyst No. | Catalyst | Conversion % | Yield, % | Modivity, % | Steam Ratio |
|---|---|---|---|---|---|
| 56 | 0 % K | 32.0 | 29.3 | 91.7 | 19.6 |
| 57 | 2.5 % K | 41.4 | 38.4 | 92.7 | 21.1 |
| 58 | 5.0 % K | 34.0 | 32.3 | 95.2 | 19.3 |
| 59 | 7.5 % K | 33.9 | 32.3 | 95.2 | 19.0 |
| 60 | 10.0 % K | 24.5 | 24.1 | 98.0 | 19.0 |
| 61 | 12.5 % K | 18.8 | 18.5 | 98.2 | 17.6 |

TABLE XV

1000°F., Oxygen 264 GHSV, Feed 300 GHSV

| Catalyst No. | Catalyst | Conversion % | Yield, % | Modivity, % | Steam Ratio |
|---|---|---|---|---|---|
| 56 | 0.0 % K | 38.2 | 34.4 | 90.3 | 19.6 |
| 47 | 2.5 % K | 45.2 | 42.2 | 93.2 | 21.1 |
| 58 | 5.0 % K | 47.4 | 44.2 | 93.2 | 19.3 |
| 59 | 7.5 % K | 46.8 | 43.9 | 93.1 | 19.0 |
| 60 | 10.0 % K | 44.7 | 42.3 | 94.5 | 19.0 |
| 61 | 12.5 % K | 39.7 | 37.5 | 94.5 | 17.6 |

These data indicate high effectiveness of our potassium promoted tin/phosphorus/oxygen catalysts.

Reasonable variations and modifications are possible within the scope of this disclosure without departing from the spirit and scope thereof.

We claim:

1. A dehydrogenation catalyst composition which consists essentially of about 0.1 to 16 weight per cent phosphorus, about 15 to 75 weight per cent tin, about 0.1 to 10 weight per cent lithium, wherein said amounts of phosphorus, tin, and lithium total less than 100 percent such that the difference therebetween being substantially combined oxygen, all weight percentages based on total weight of the final said dehydrogenation catalyst composition.

2. A method of preparing said dehydrogenation catalyst composition as defined in claim 1 which comprises:

a. admixing at least one phosphorus-containing material and at least one tin-containing material, b. drying said admixed materials from said step (a), c. adding a lithium metal or lithium-containing material to said dried admixed materials from step (b), d. drying said mixed materials from step (c), e. calcining said dried mixed materials from said step (d), and thereby producing said dehydrogenation catalyst composition.

3. The process as defined in claim 2 wherein said phosphorus-containing material is an acid, oxide, halide, or a Group Ia or IIa metal or ammonium phosphate;

said tin-containing material is a halide, sulfate, oxide, nitrate, acetate, or tartrate; and said lithium-containing material is a nitrate, halide, sulfate, oxalate, acetate, carbonate, propionate, tartrate, oxide, or hydroxide.

4. The process according to claim 3 wherein said drying in said step (d) is conducted for from about 2 to 24 hours at temperatures of from about 100° to 300°F., and said calcining in said step (e) is conducted for from about 1 to 24 hours at temperatures of from about 1,000° to 1,500°F.

5. An oxidative dehydrogenation process employing the dehydrogenation catalyst composition as defined in claim 1 wherein is dehydrogenated at least one material selected from the group consisting of alkenes, cycloalkenes, alkyl-pyridines, and alkyl aromatics, under dehydrogenation conditions including an elevated temperature in the presence of a molecular oxygen-containing gas.

6. The process according to claim 5 wherein said alkene contains from 3 to 10 carbon atoms per molecule, said cycloalkene contains from 4 to 10 carbon atoms per molecule, said alkylpyridine and said alkyl aromatic each contain from 1 to 4 alkyl groups per molecule with at least one said alkyl group containing at least 2 carbon atoms per said alkyl group;

said dehydrogenation conditions further include a temperature of from about 700° to 1,300°F., a pressure of from about 0.05 to 250 psia, an oxygen:gaseous organic compound feed volume ratio of from about 0.1:1 to 3:1, and an organic compound feed space rate of from about 50 to 5,000.

7. The process according to claim 6 wherein said oxidative dehydrogenation process further includes the presence of steam, and said steam is employed in a volume ratio of steam to organic compound feed of from about 0.1:1 to 50:1.

8. The process according to claim 7 wherein said organic compound feed is butene.

9. A method of preparing said dehydrogenation catalyst composition as defined in claim 1 which comprises:
  a. admixing at least one phosphorus-containing material and at least one tin-containing material in the form of an aqueous solution or dispersion of said materials containing from about 0.01 to 10 molar concentration of said materials,
  b. adding to said aqueous solution or dispersion admixture at least one compound selected from the group consisting of ammonium hydroxide, sodium hydroxide and potassium hydroxide thereby forming a wet gel,
  c. filtering and washing said wet gel,
  d. adding lithium metal or a lithium-containing material to said washed gel,
  e. drying the resulting composition from step (d),
  f. calcining said dried composition from step (e), and thereby producing said dehydrogenation catalyst composition.

10. The process according to claim 9 wherein said dehydrogenation catalyst composition is subjected to a particle forming step prior to the calcination step.

11. A dehydrogenation catalyst composition which consists essentially of a calcined composition of about 0.1 to 16 weight per cent phosphorus, about 15 to 75 weight per cent tin, about 0.1 to 10 weight per cent of at least one Group I$a$ metal, and oxygen or oxygen and sulfur, all weight percentages based on total weight of the final said dehydrogenation catalyst composition.

12. A method of preparing said dehydrogenation catalyst composition as defined in claim 11 which comprises:
  a. admixing at least one phosphorus-containing material and at least one tin-containing material,
  b. drying said admixed materials from said step (a),
  c. adding a Group I$a$ metal or Group I$a$ metal-containing material to said dried admixed materials from step (b),
  d. drying said mixed materials from step (c),
  e. calcining said dried mixed materials from said step (d), and thereby producing said dehydrogenation catalyst composition.

13. The process as defined in claim 12 wherein said phosphorus-containing material is an acid, oxide, halide, or a Group I$a$ or II$a$ metal or ammonium phosphate:
  said tin-containing material is a halide, sulfate, oxide, nitrate, acetate, or tartrate; and
  said Group I$a$ metal-containing material is a nitrate, halide, sulfate, oxalate, acetate, carbonate, propionate, tartrate, oxide, or hydroxide.

14. The process according to claim 13 wherein said drying in said step (d) is conducted for from about 2 to 24 hours at temperatures of from about 100° to 300°F., and said calcining in said step (e) is conducted for from about 1 to 24 hours at temperatures of from about 1,000° to 1,500°F.

15. The process according to claim 14 wherein said Group I$a$ metal or metal-containing material is at least one of lithium, sodium, or potassium.

16. An oxidative dehydrogenation process employing the dehydrogenation catalyst composition as defined in claim 11 wherein is dehydrogenated at least one material selected from the group consisting of alkenes, cycloalkenes, alkylpyridines, and alkyl aromatics, under dehydrogenation conditions including an elevated temperature in the presence of a molecular oxygen-containing gas.

17. The process according to claim 16 wherein said alkene contains from 3 to 10 carbon atoms per molecule, said cycloalkene contains from 4 to 10 carbon atoms per molecule, said alkylpyridine and said alkyl aromatic each contain from 1 to 4 alkyl groups per molecule with at least one said alkyl group containing at least 2 carbon atoms per said alkyl group;
  said dehydrogenation conditions further include a temperature of from about 700° to 1,300°F., a pressure of from about 0.05 to 250 psia, an oxygen:-gaseous organic compound feed volume ratio of from about 0.1:1 to 3:1, and an organic compound feed space rate of from about 50 to 5,000.

18. The process according to claim 17 wherein said oxidative dehydrogenation process further includes the presence of steam, and said steam is employed in a volume ratio of steam to organic compound feed of from about 0.1:1 to 50:1.

19. The process according to claim 18 wherein said at least one Group I$a$ metal containing component is lithium, sodium, or potassium.

20. The process according to claim 19 wherein said organic compound feed is butene.

21. A method of preparing said dehydrogenation catalyst composition as defined in claim 11 which comprises:
  a. admixing at least one phosphorus-containing material and at least one tin-containing material in the form of an aqueous solution or dispersion of said materials containing from about 0.01 to 10 molar concentration of said materials,
  b. adding to said aqueous solution or dispersion admixture at least one compound selected from the group consisting of ammonium hydroxide, sodium hydroxide and potassium hydroxide thereby forming a wet gel,
  c. filtering and washing said wet gel,
  d. adding an alkali metal or alkali metal containing material to said washed gel,
  e. drying the resulting composition from step (d),
  f. calcining said dried composition from step (e), and thereby producing said dehydrogenation catalyst composition.

22. The process according to claim 21 wherein said dehydrogenation catalyst composition is subjected to a particle forming step prior to the calcination step.

23. The process according to claim 22 wherein said alkali metal or alkali metal containing material is at least one of lithium, sodium, or potassium.

* * * * *